(12) United States Patent
Sepez et al.

(10) Patent No.: US 7,395,369 B2
(45) Date of Patent: Jul. 1, 2008

(54) DISTRIBUTING DATA ACROSS MULTIPLE STORAGE DEVICES

(75) Inventors: Thomas V. Sepez, Pleasanton, CA (US); William H. Bridge, Jr., Alameda, CA (US)

(73) Assignee: Oracle International Corporation, Redwood Shores, CA (US)

( * ) Notice: Subject to any disclaimer, the term of this patent is extended or adjusted under 35 U.S.C. 154(b) by 576 days.

(21) Appl. No.: 10/848,845

(22) Filed: May 18, 2004

(65) Prior Publication Data
US 2005/0262038 A1   Nov. 24, 2005

(51) Int. Cl.
*G06F 12/00* (2006.01)
(52) U.S. Cl. ...................................... 711/114
(58) Field of Classification Search ................. 711/114, 711/112, 111; 707/204, 200, 10
See application file for complete search history.

(56) References Cited

U.S. PATENT DOCUMENTS

| | | | |
|---|---|---|---|
| 6,381,619 B1 * | 4/2002 | Borowsky et al. | 707/204 |
| 6,405,284 B1 * | 6/2002 | Bridge | 711/114 |
| 6,408,359 B1 * | 6/2002 | Ito et al. | 711/114 |
| 6,571,258 B1 * | 5/2003 | Borowsky et al. | 707/204 |
| 2002/0091722 A1 * | 7/2002 | Gupta et al. | 707/204 |
| 2004/0193397 A1 * | 9/2004 | Lumb et al. | 703/24 |
| 2004/0236743 A1 * | 11/2004 | Blaicher et al. | 707/7 |
| 2005/0144199 A2 * | 6/2005 | Hayden | 707/204 |

OTHER PUBLICATIONS

Heapsort, Chapter 7, in the book entitled "Introduction to Algorithms" by Thomas H. Cormen et al. 1990.

* cited by examiner

*Primary Examiner*—John Cottingham
*Assistant Examiner*—Sherief Badawi
(74) *Attorney, Agent, or Firm*—Silicon Valley Patent Group LLP; Omkar Suryadevara

(57) ABSTRACT

Pieces of data are stored among storage devices based on a cycle value, which is computed for each storage device as the total capacity of all storage devices divided by the individual capacity of the storage device. Next, a storage device for a current piece of data is selected to be the storage device with the smallest key value; followed by determination of a new key value based on at least (a) the cycle value and (b) a sequence number of the current piece. After allocation, if the number of storage devices changes, reallocation is done similarly except that selection is first from a preferred set and only if the preferred set is empty then from a remainder set. Storage devices are placed in the preferred set if a piece of data would be outside a shadow (based on cycle value) of another piece pre-existing in the storage device.

36 Claims, 9 Drawing Sheets

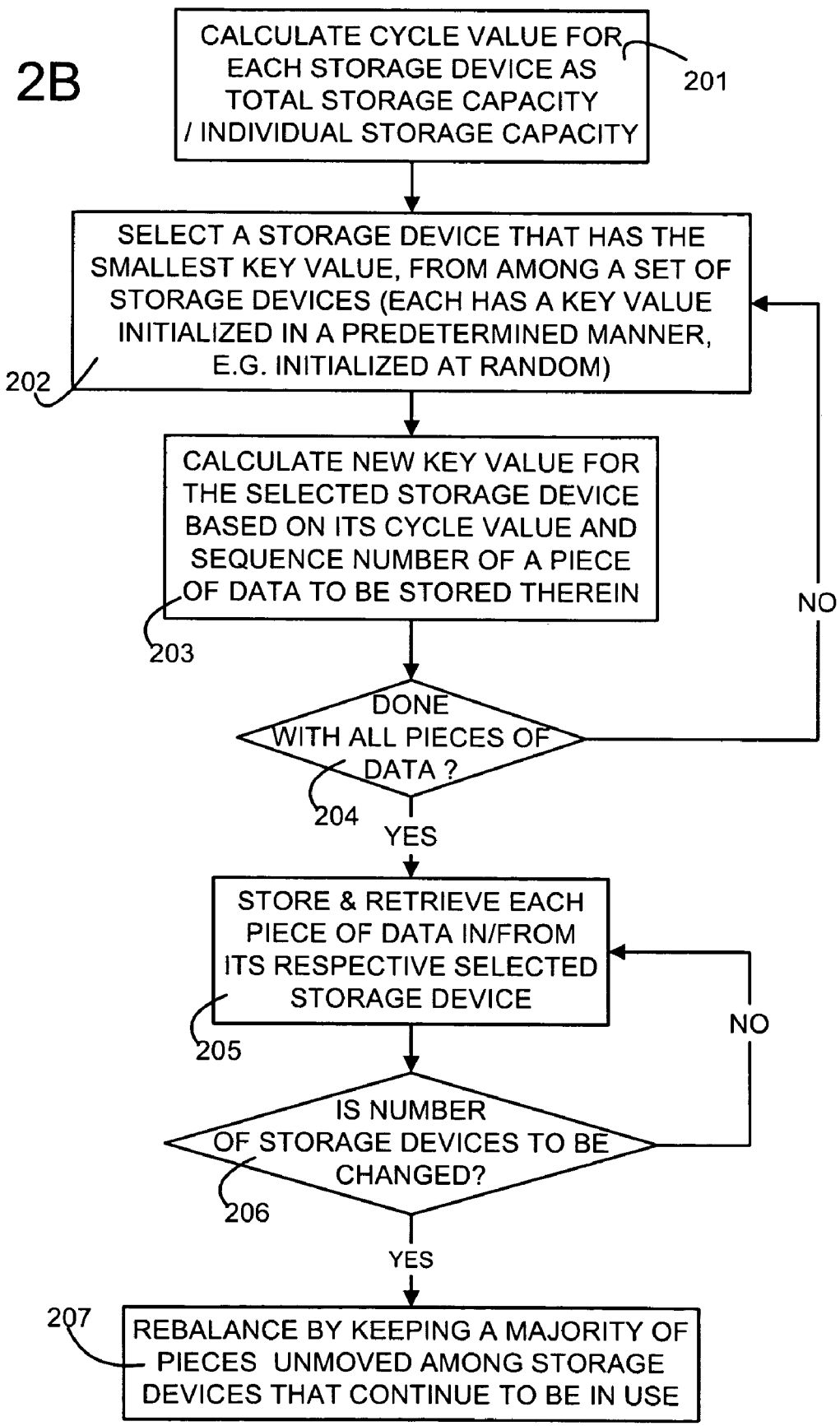

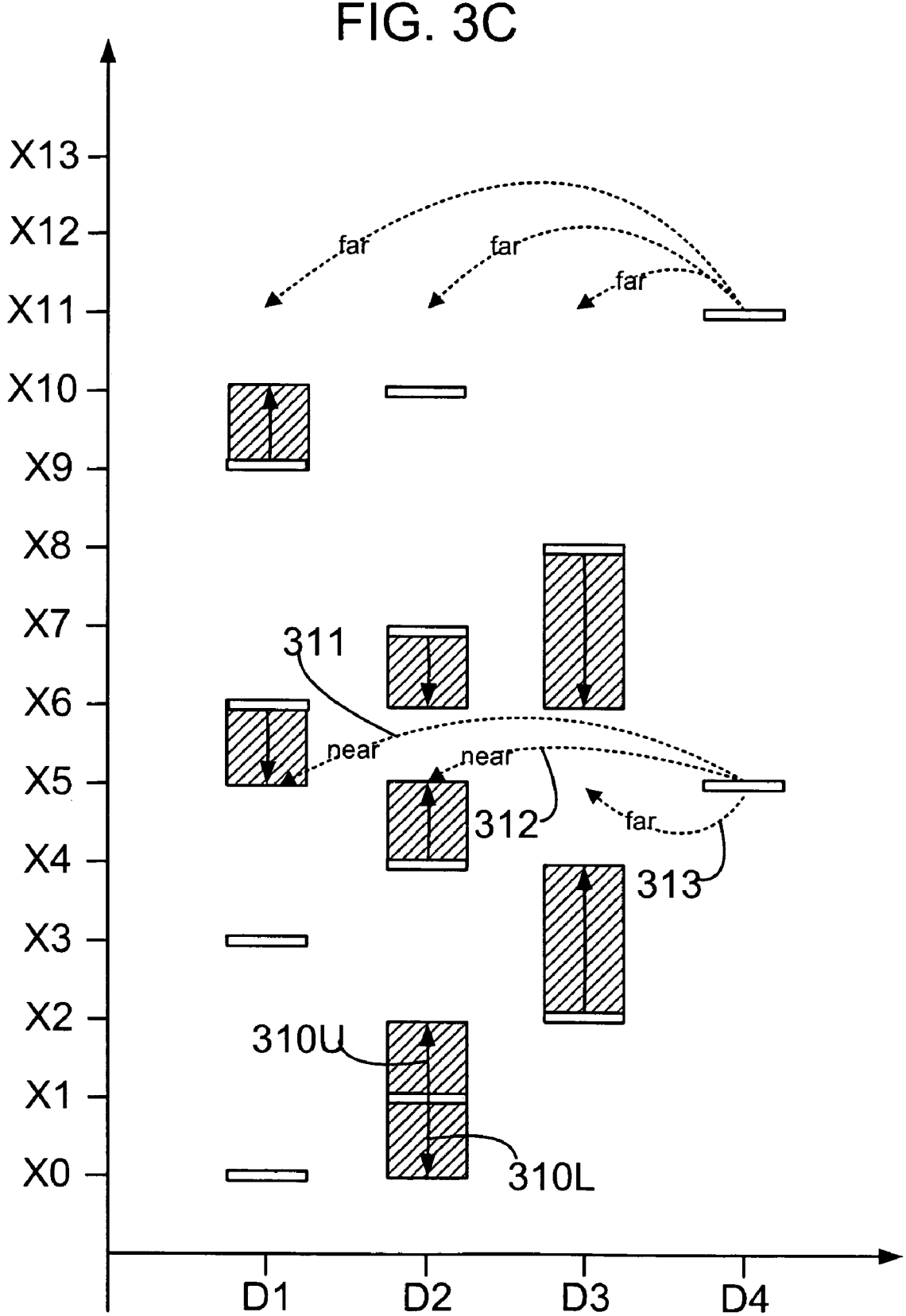

DISTRIBUTING DATA ACROSS MULTIPLE STORAGE DEVICES

BACKGROUND

Conventional data storage systems may include one or more data storage devices (e.g. disk drives) connected to a controller or manager. A logical volume manager (also called a logical disk manager) can be used to manage systems containing multiple data storage devices. The logical volume manager configures a pool of storage devices into logical volumes so that applications and users interface with logical volumes instead of directly accessing physical media. The logical volume manager divides each storage device into one or more partitions. Each partition can, and typically does, have a different length. When a logical volume is no longer needed, its partitions are deleted so that space on the disk drives is made available for another partition to be created. However if a new partition is larger than the available space, then the space cannot be reused for the new partition. If the new partition is smaller than the available space, then a portion of the free space will be used and an even smaller piece will remain free. Over time, this results in many small pieces of free space that cannot be reused. This problem is often referred to as "fragmentation."

U.S. Pat. No. 6,405,284 granted to Bridge on Jun. 11, 2002, and entitled "Distributing data across multiple data storage devices in a data storage system" is incorporated by reference herein in its entirety. This patent describes an invention, in which, one feature of one embodiment is to divide each disk drive into many small fixed size pieces. During normal operation, storage space on a disk drive is allocated and freed in units of the fixed size pieces. Fragmentation is reduced or eliminated because all pieces are the same size. Another feature described in this patent is that each logical volume is made of pieces from many disk drives. The pieces of a logical volume are spread out as evenly as is practical so that two pieces on the same disk drive are far apart in the address space of the logical volume. Thus I/O load is spread evenly over all disk drives.

Prior art methods of allocating the pieces to disk drives (hereinafter, simply "disks") have certain disadvantages. For example, if pieces are allocated to disks in a round-robin fashion, then disks that are smaller run out of space faster than larger disks. In the following example, assume there are four disks, consisting of two disks D1 and D2 of 200 MB each and two disks D3 and D4 of 100 MB each. If one were to use round-robin scheme to allocate eight pieces (of 50 MB each), then the distribution results as shown in FIG. 1 and in the following table (wherein X1-X8 are the labels of the eight pieces).

| D1 | D2 | D3 | D4 |
|---|---|---|---|
| X1 | X2 | X3 | X4 |
| X5 | X6 | X7 | X8 |
| AVAILABLE | AVAILABLE | N/A | N/A |
| AVAILABLE | AVAILABLE | N/A | N/A |

In the above table, D1 and D2 have space available whereas D3 and D4 do not have any available space (denoted as "N/A" because these disks are smaller). Therefore, the round-robin allocation causes D3 and D4 to become full although D1 and D2 are only half full.

Another method (called "sequential proportional") computes a weight for each disk, as the ratio of each individual disk's capacity divided by the total storage capacity of all disks. In the above-described example, the weights are as follows:

| D1 | D2 | D3 | D4 |
|---|---|---|---|
| 1/3 | 1/3 | 1/6 | 1/6 |

Next, the weights are multiplied by the total number of pieces, to decide how many pieces are to be allocated to each disk. So if there are twelve pieces of 25 MB each that are to be allocated, then D1 receives four pieces (X1-X4), D2 receives four pieces (X5-X8), D3 receives two pieces (X9, X10) and D4 receives two pieces (X11, X12) as follows.

| D1 | D2 | D3 | D4 |
|---|---|---|---|
| X1 | X5 | X9 | X11 |
| X2 | X6 | X10 | X12 |
| X3 | X7 | N/A | N/A |
| X4 | X8 | N/A | N/A |

The above distribution is more uniform across the disks because all disks become full at about the same time. But this method has the problem that when data is being accessed from the first disk D1, the remaining disks D2-D4 are kept idle which results in lower throughput than possible (if all disks were being accessed in parallel). Another problem with this method (as well as the round robin scheme) is that if a disk were to be dropped (e.g. if disk D4 is to be removed), then movement of D4's pieces to one of the remaining disks can result in an uneven distribution (wherein some disks have many more pieces than other disks). Hence an improved method for allocating pieces to disks will be useful.

SUMMARY

In accordance with the invention, pieces of data are stored among storage devices based on a cycle value, which is computed for each storage device as the total capacity of all storage devices divided by the individual capacity of the storage device. Specifically, a storage device for a current piece of data is selected, in several embodiments of the invention, to be the storage device with the smallest key value (and key values are initially selected in a predetermined manner, e.g. at random). A new key value is determined for the selected storage device, based on at least (a) the cycle value and (b) a sequence number of the current piece.

After allocation of the data pieces among the existing storage devices, if the number of storage devices changes, reallocation is done similarly except that selection is first done from a preferred set and only if the preferred set is empty then from a remainder set. Storage devices are placed into the preferred set based on a predetermined criterion as follows: if a piece of data to be added would be outside a range (which is a predetermined fraction of the cycle value) that is centered around a piece that is already pre-existing in the storage device. If the to-be-added piece would be within the range (also called "shadow") of another piece, then the storage device is placed in the remainder set. From within a set (the preferred set or the remainder set), storage devices are again selected by minimizing their key value (as discussed above).

Although the above predetermined criterion refers to a range around a pre-existing piece, and checking if the to-be-added piece falls within the range, an equivalent result is obtained by switching pieces as follows. A pre-existing piece is checked for falling within a range centered around the to-be-added piece. Numerous such variations, modifications and adaptations of embodiments described herein will be apparent to the skilled artisan, in view of this disclosure.

BRIEF DESCRIPTION OF THE DRAWINGS

FIG. 2B illustrates, in a high level flow chart, acts performed in several embodiments of the invention, to approximate or to attain an ideal allocation of the type shown in FIG. 2A, by use of key value that is based on (a) the relative size of a current storage device and (b) a sequence number of a current piece.

FIG. 3C illustrates, in a two-dimensional map, use of "shadows" around pre-existing pieces in a storage device, to reduce the likelihood of local nonuniformity during reallocation by the method of FIG. 3B.

DETAILED DESCRIPTION

Figure 1:
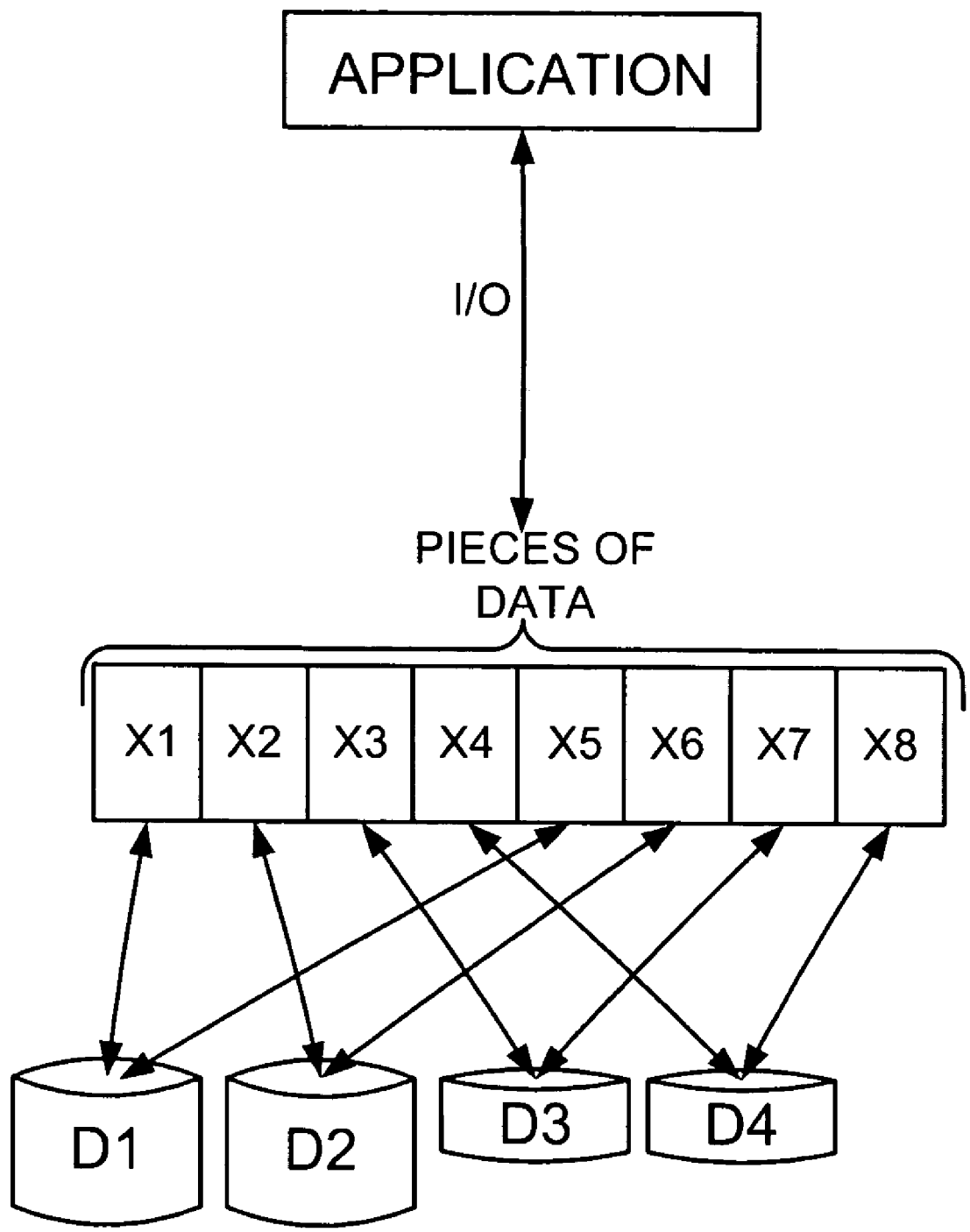
FIG. 1A illustrates, in a block diagram, use of a round-robin scheme in the prior art, to distribute data pieces X1-X8 among disks D1-D4.
Figure 2A:
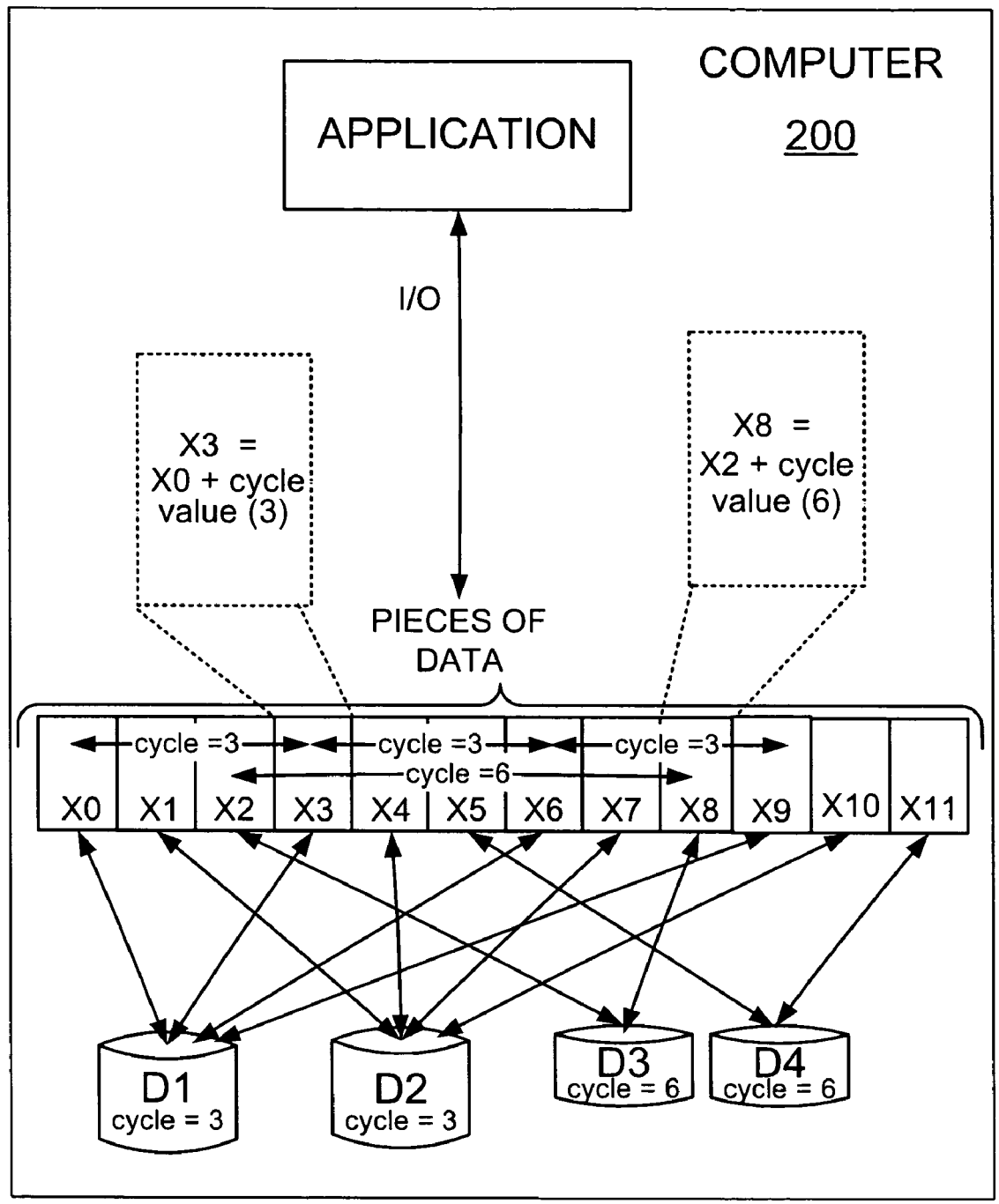
FIG. 2A illustrates, in a block diagram, an allocation of pieces X0-X11 to storage devices D1-D4 in accordance with the invention, that maintains global uniformity based on the relative size of each storage device and that also maintains local uniformity within each storage device among adjacent pieces (local uniformity is shown in units of cycles for storage devices D1 and D3).

In accordance with the invention, pieces of data X0-XN (wherein $0 \leq I \leq N$, with (N+1) being the total number of pieces) are ideally allocated to storage devices D1-DM (wherein $1 \leq J \leq M$, with M being the total number of storage devices) to be globally uniform (i.e. spread across all the storage devices) and also locally uniform (i.e. spaced apart within each storage device). Such an ideal allocation is illustrated in FIG. 2A wherein twelve pieces X0-X11 are shown allocated to storage devices D1-D4. Storage devices D1-D4 have the above-described storage capacities (also called "sizes") of 200 MB, 200 MB, 100 MB and 100 MB respectively. Local uniformity within a disk is maintained in accordance with the invention, by enforcing a cycle requirement on allocation within each storage device, based on the capacity of the individual storage device relative to the total capacity. Specifically, for a given storage device DJ, the ratio: total capacity of all storage devices $\Sigma$ size(DJ) divided by the individual capacity of the given storage device size(DJ) provides a "cycle value", as follows:

$$\text{cycle value } (DJ) = \Sigma \text{ size}(DJ)/\text{size}(DJ)$$

The cycle value maintains local uniformity within a disk, when each piece XI within a storage device DJ is required to be spaced apart from another piece XK within the disk DJ, by the amount cycle value (DJ). For example, in FIG. 2A, storage device D1 has the cycle value (600/200)=3. And once an extent X0 has been allocated to storage device D1, the next extent (also called "deadline") is identified by simply adding the sequence number "0" (of extent X0) and the cycle value 3=0+3=3. Therefore, X3 is the next extent that is ideally allocated to storage device D1. Similarly, once extent X1 is allocated to storage device D2, the next extent to be allocated to device D2 is identified as 1+3=4, i.e. the next extent is X4 (and the deadline is 4). Note that storage devices D1 and D2 both have the same cycle value of 3 (due to their respective storage capacity of 200 MB) whereas storage devices D3 and D4 both have the same cycle value of 6 (due to their capacity of 100 MB).

Next, extent X2 may be allocated to storage device D3, in which case the deadline is 2+6=8 and the next extent is X8. At this stage, neither of extents X3 and X4 can be allocated to storage device D4, because both these extents are already identified as the next extents for the respective storage devices D1 and D2. For this reason, it is extent X5 that is now available for allocation to storage device D4. After each storage device D1-DM has received its first allocation of an extent, all remaining extents are automatically allocated by the above-described formula for the deadline (cycle value+sequence number). The resulting allocation is shown in FIG. 2A for a total of twelve extents, although any number of extents can be allocated in this manner (assuming space is available on each storage device). In the just-described scheme, when any storage device becomes full, all other storage devices also become full (or about to become full).

Several embodiments implement the above-described allocation mechanism by performing acts 201-207 illustrated in FIG. 2B, which are described next. Specifically, in act 201, the cycle value is calculated for each storage device, as per the above-described formula. Next, in act 202, a particular storage device DK is selected if it has the smallest key value from among all storage devices D1-DM. Depending on the embodiment, key values are initially set by a predetermined method, e.g. set at random (when none of the pieces has been allocated to any storage device).

Alternatively, key values may be set as follows: positional fraction*cycle value, wherein positional fraction is a real number between 0.0 and 1.0 that is selected based on the location of the storage device in a sequence. For example, if storage devices are randomly sequenced as D1, D4, D3, D2 then their respective positional fraction is 0, ¼, ½, and ¾. In this example, these fractions, when multiplied by the respective cycle values, yield the following initial key values: D1=0, D4=1.5, D3=3 and D2=2.25. In this disclosure, the same label "D1" is used to identify (a) a storage device, and also (b) key for the storage device when followed by the "=" sign and followed by the key value.

Regardless of how the initial key values are set, in act 202, a particular storage device (e.g. D1 in the above example) is selected to receive the current extent (e.g. X0 in the above example). Next, in act 203, a new key value for the selected storage device is determined, based on at least (a) the cycle value of the selected storage device (e.g. D1) and (b) a sequence number of the current piece (e.g. X0). In many embodiments, the new key value is simply obtained by adding up these two numbers (e.g. 3+0=3 is the new key value for D1 in the above example). In some embodiments, an additional number, such as a randomized fraction is added, to break ties among storage devices having the same key values.

Figure 2C:
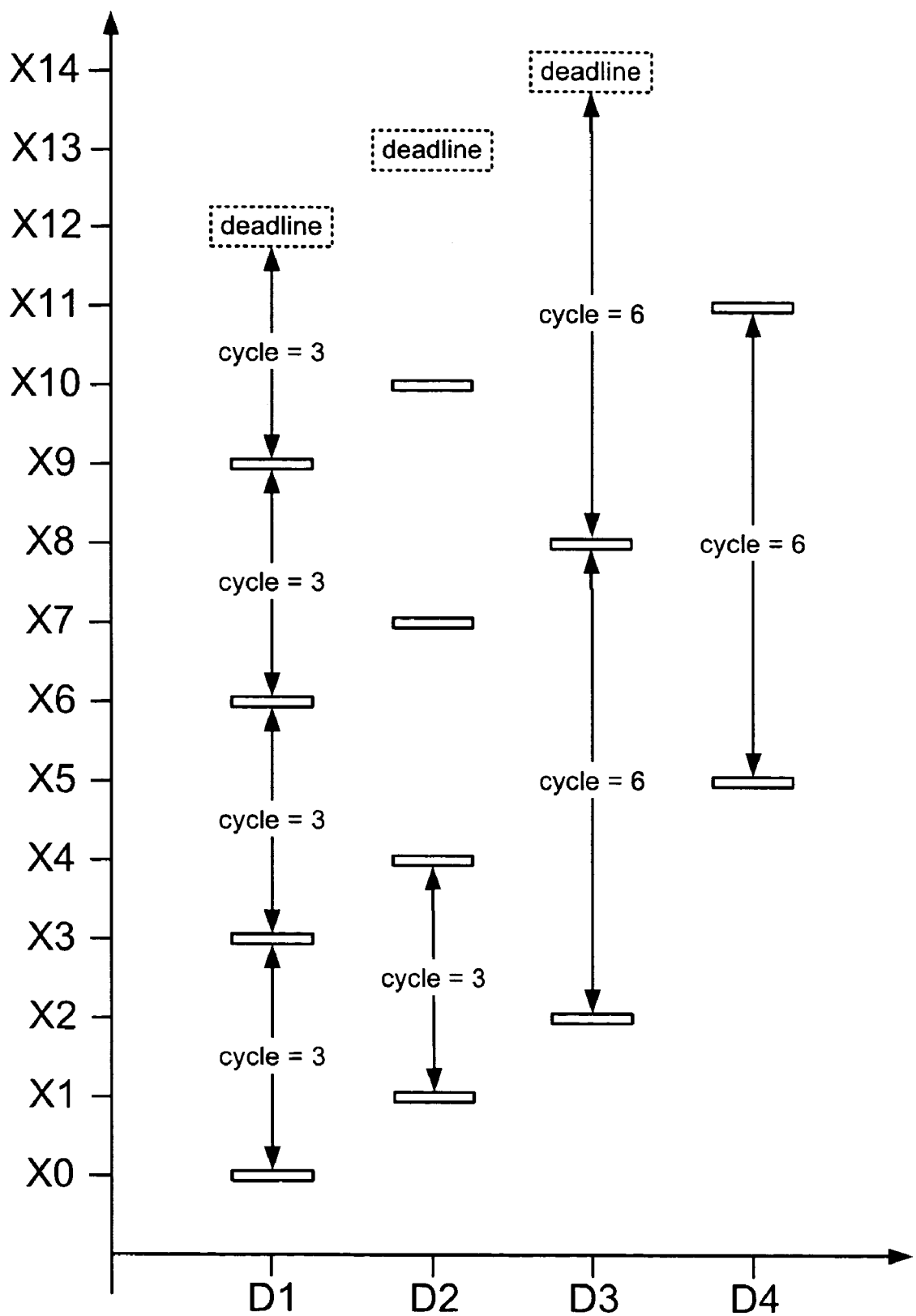
FIG. 2C illustrates, in a two-dimensional map, cyclic nature of the allocation of FIG. 2B, wherein the number of cycles depends on the relative size of the storage device.

Thereafter, if not all extents have been allocated (as per act 204), acts 202 and 203 are repeatedly performed, for each piece of data, until all pieces have been allocated. After all pieces are allocated, the resulting allocation map (FIG. 2C) shows that the distribution of extents is globally as well as locally uniform. The allocation is thereafter used to actually store the information of each extent in the respectively selected storage device, as per act 205.

If at any future time, the number of storage devices needs to be changed (as per act 206), then pieces may need to be moved. Specifically, if a currently-in-use storage device is being dropped, then its pieces need to be transferred to one of the remaining storage devices. Alternatively, if an unused storage device is being added, then some pieces from currently-in-use storage devices need to be transferred to this unused storage device to make use of it. The just-described transfers may cause an imbalance in the allocation of extents among the changed set of storage devices, i.e. the above-described global and local uniformity may be lost and a re-allocation (also called rebalance) of all extents X0-XN may be required, to approximate or attain uniformity in distribution.

Figure 3A:
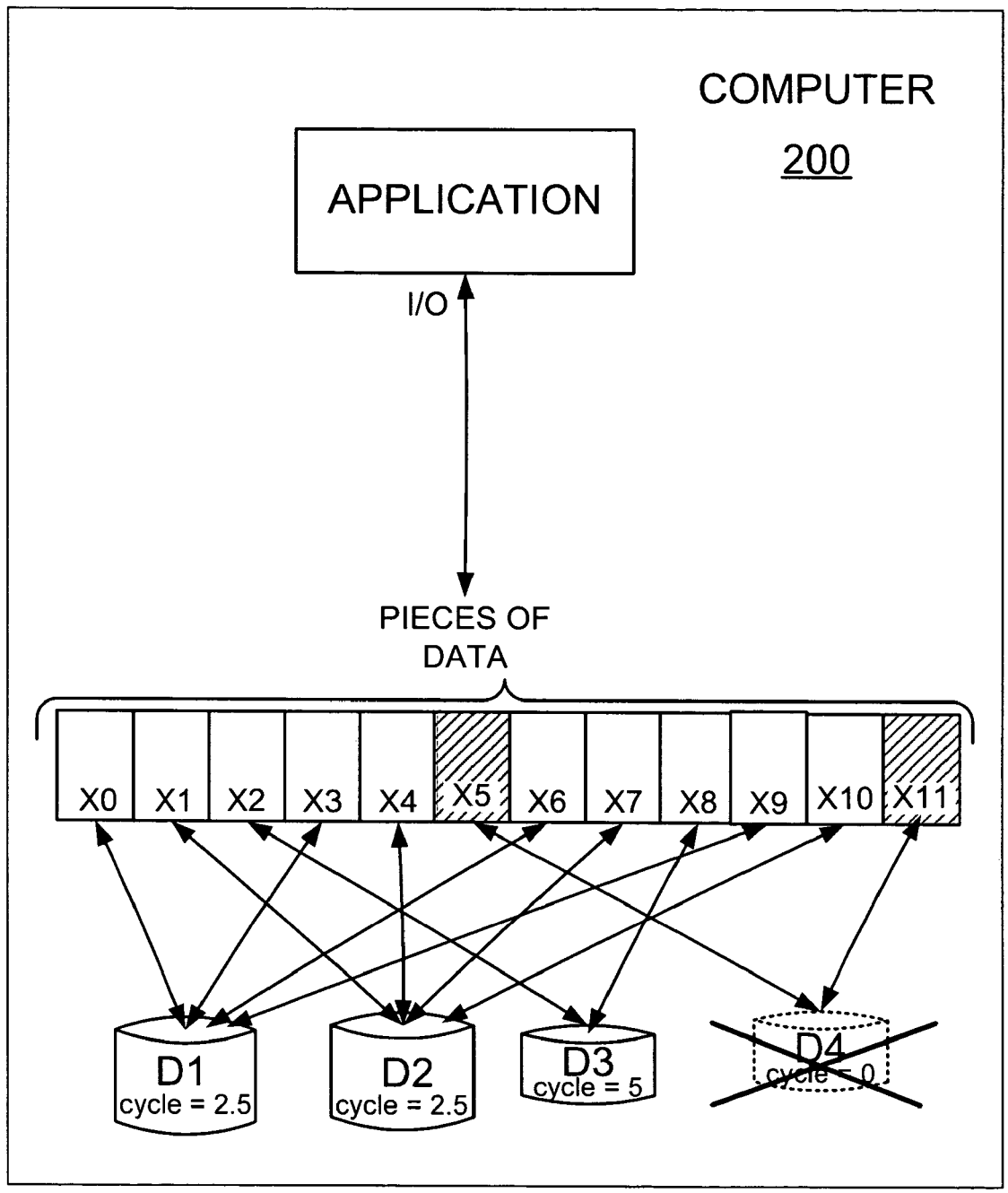
FIG. 3A illustrates the block diagram of FIG. 2A, wherein a change is to be made, by removal of storage device D4, which requires movement of pieces X5 and X11 to another storage device.

In accordance with the invention, a rebalance is performed while keeping a majority (i.e. more than 50%) of the existing extents unmoved (i.e. kept where-ever they are originally resident), as discussed next. FIG. 3A illustrates the example of FIG. 2A wherein storage device D4 is to be removed. Hence, at a minimum, extents X5 and X11 need to be transferred to one of storage devices D1-D3. Moreover, depending on the situation (e.g. if both X5 and X11 end up on the same device D2), it may become necessary to move one or more extents among devices D1-D3, to maintain global and local uniformity. A new allocation for each extent X1 in the sequence X0-XN is determined by performing acts 301-308 illustrated in FIG. 3B and described next.

Specifically, as the number of storage devices has changed, a new cycle value is calculated (as per act 301), and it is this new cycle value that is used in the following acts 302-308. For example, when D4 is to be removed, the cycle values for D1-D3 are as follows: 2.5, 2.5, and 5. Note that although an extent for each disk is normally located at integer cycle values, the fractional portion (such as 0.5) of a cycle value, if any, is preserved for use in subsequent calculations, so that eventually, the average cycle value for each disk approaches such real numbers. Next, as per act 303, a predetermined criterion is applied to divide the storage devices into two sets: a first set is to be preferred over a second set. Once the two sets are formed, a storage device is selected from the first set (by minimizing key value in the above described manner) as per acts 304 and 305, and otherwise selected from the second set (also in the same manner) as per act 306. Next, if all extents have been allocated (as per act 307), the new allocation is used (as per act 308) but if any extents remain then control returns to act 302 (described above).

In some embodiments, the first set and the second set are implemented by two priority queues, of the type well known in the art. Each priority queue keeps track of the extents contained in the respective set, and also their relative priorities (in the form of key values). Priority queues are described in a number of text books well known in the art, such as Chapter 7 entitled "Heapsort" in the book "Introduction to Algorithms" by Thomas H. Cormen et al. This entire chapter is incorporated by reference herein in its entirety. The priority queue for the first set is also referred to herein as a "deadline" queue, e.g. DEADLN_PQ, whereas the priority queue for the second set is also referred to herein as a "bad deadline" queue, e.g. BAD_DEADLN_PQ.

The predetermined criterion applied in act 303 (FIG. 3B) is chosen in some embodiments to reduce or minimize the movement of previously stored extents, as follows: storage devices are included in the above-described first set only if a new extent, when placed in a current storage device, would be outside a range centered around any extent pre-existing in the current storage device. For example, a range is defined in FIG. 3C by arrows 310U and 310L around the extent X1 which is currently existing in storage device D2 (prior to rebalance). The range defines a "shadow" (shown as a hatched-box in FIG. 3C) around extent X1 in device D2 that is preferably not entered when allocating a new extent to device D2.

Therefore, if a new extent, when allocated, were expected to fall within such a shadow (i.e. the new extent will be too "near" an existing extent), then the device is placed in the second set (as illustrated by arrows 311 and 312 in FIG. 3C which shows formation of the second set for extent X5 by addition of devices D1 and D2). On the other hand, if the new extent, when allocated, were expected to fall outside such a shadow (i.e. the new extent is "far" from all existing extents), then device is placed in the first set (as illustrated by arrow 313 which shows formation of the first set for extent X5 by addition of device D3). Note that in FIG. 3C, for most extents, only half-shadows that affect an extent being reallocated are shown for the purposes of illustration and clarity (although full shadows are available for use, if necessary, to make such decisions). In the example illustrated in FIG. 3C, the shadows of storage device D3 are sufficiently far away that extent X5 is clear of these shadows. Note also, that for extent X11, all devices D1-D3 are added to the first set, because extent X11 does not fall within any extent's shadow in any of devices D1-D3, i.e. the extents existing in D1-D3 are all "far" from X11. As noted above, once the two sets are formed, then a single storage device is selected therefrom, based on the key value, preferably from the first set (e.g. DEADLN_PQ) and if not available then from the second set (e.g. BAD_DEADLN_PQ). Note that if extent X11 is allocated to (and moved to) device D1, then the average cycle value of device D1 will be reduced to (3+3+3+2)/4=2.75. This value of 2.75 begins to approach the cycle value of 2.5 for device D1 (in the absence of device D4 as noted above in paragraph [0026]).

Use of shadows as noted above ensures that not only are new extents uniformly allocated across storage devices relative to their capacities, but even extents from a to-be-deleted storage device are inserted in the remaining storage devices in a substantially uniform manner relative to pre-existing extents. Use of the above-described range to locally reserve space (in the form of sequence number) between pre-existing extents in each storage device accommodates extents from the to-be-deleted storage device. Such accommodation significantly reduces (or even eliminates) movement of extents between storage devices.

Figure 3B:
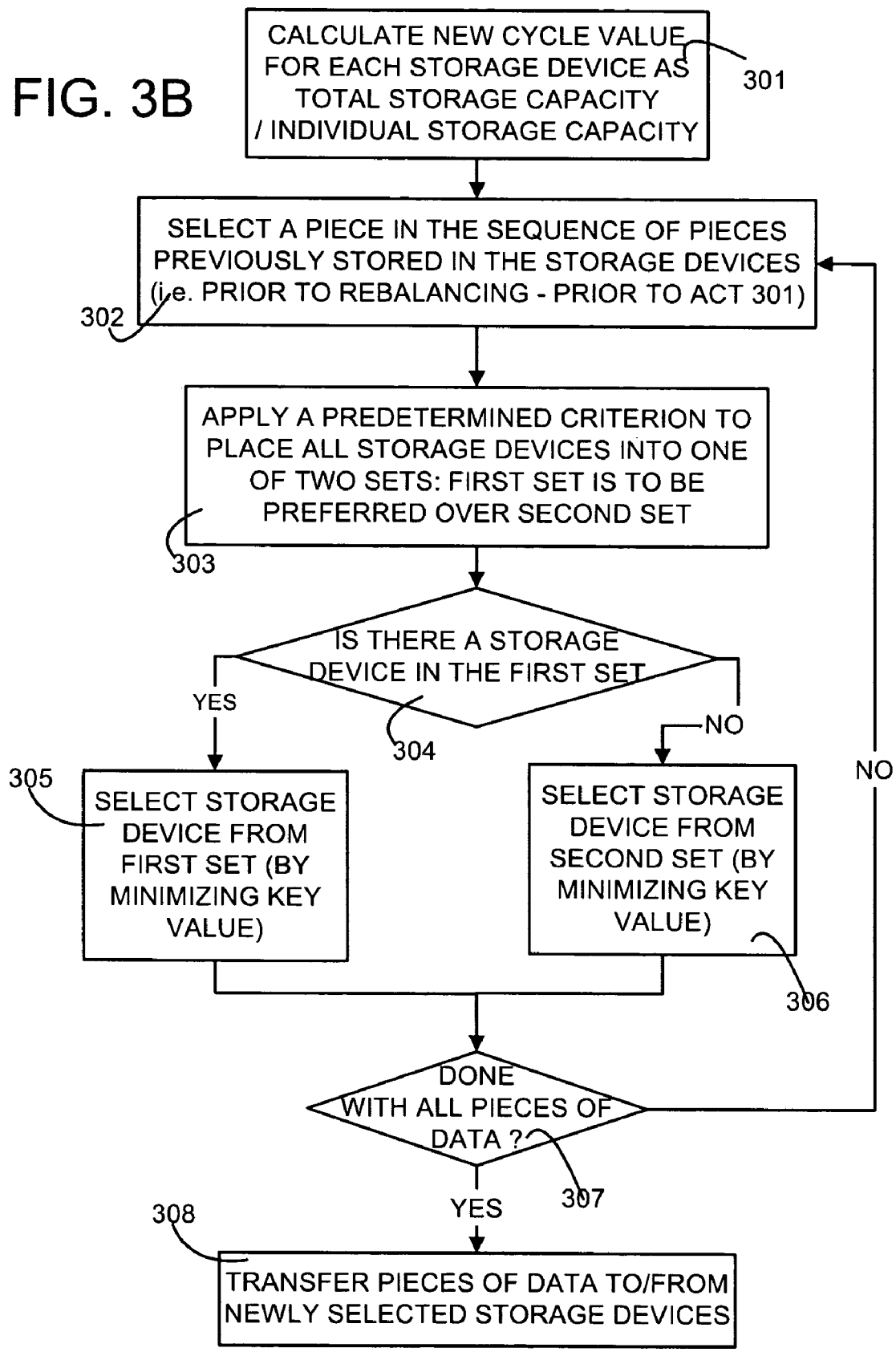
FIG. 3B illustrates, in a high level flow chart, acts performed in several embodiments of the invention, to approximate the ideal allocation while maintaining a majority of pieces X0-X11 in their currently allocated storage devices.
Figure 3D:
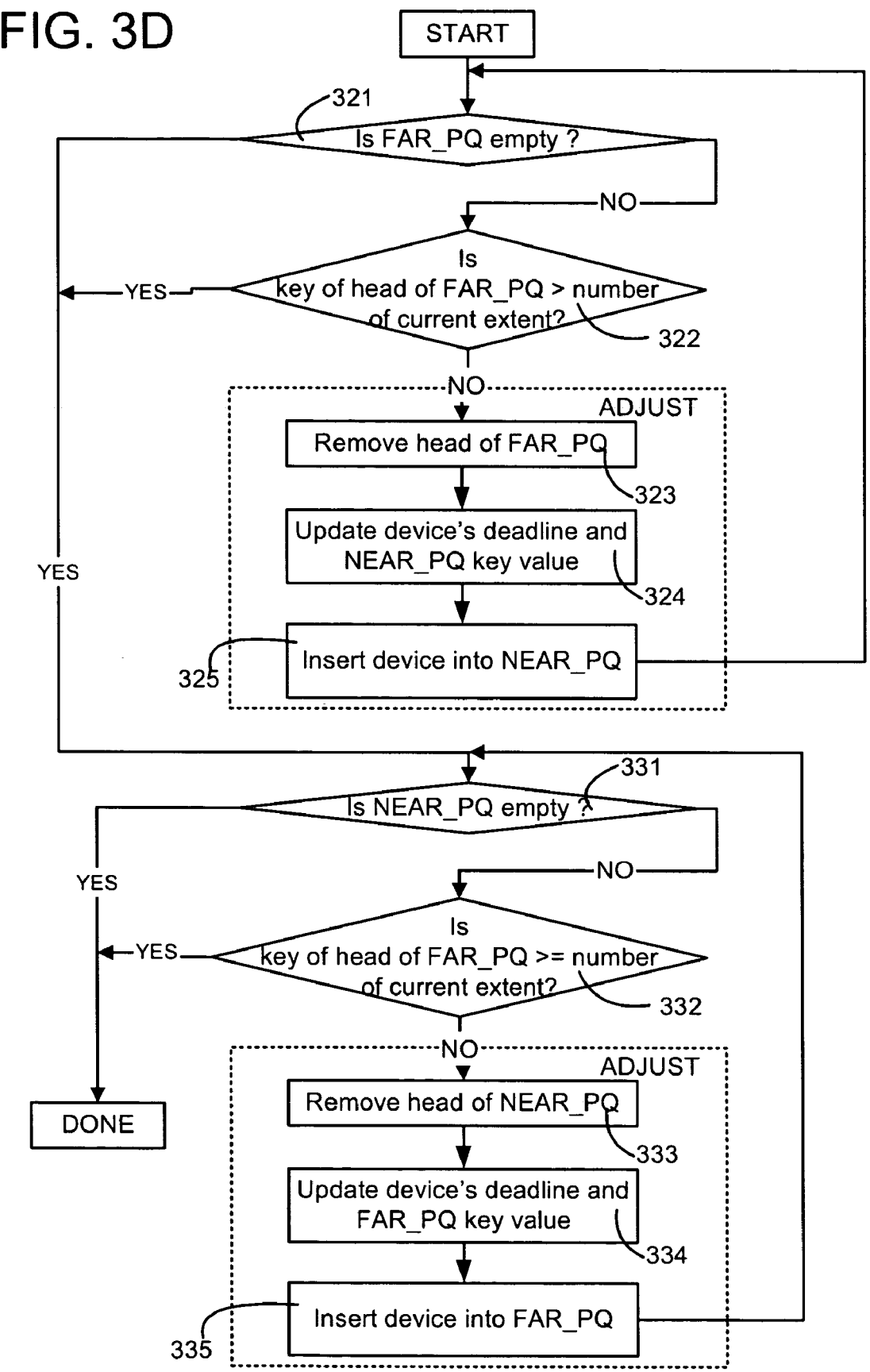
FIG. 3D illustrates, in a high level flow chart, acts performed in several embodiments of the invention, detailing the use of near and far queues when applying the predetermined criterion of act 303 in FIG. 3B to form two sets one to be preferred over the other.

Note that in some embodiments, priority queues DEADLN_PQ and BAD_DEADLN_PQ are populated by evaluating the existing extents in each and every storage device, for the shadow criterion, relative to each extent that is being reallocated. In alternative embodiments, two additional priority queues called NEAR_PQ and FAR_PQ are used as illustrated in FIG. 3D to maintain priority queues DEADLN_PQ and BAD_DEADLN_PQ. As their names imply, priority queues NEAR_PQ and FAR_PQ hold storage devices having existing extents that are too near or far from a current extent that is being reallocated. Use of priority queues NEAR_PQ and FAR_PQ reduces the number of disks that need to be evaluated for movement between queues BAD_DEADLN_PQ and DEADLN_PQ (e.g. certain storage devices are moved from the DEADLN_PQ to the BAD_DEADLN_PQ if existing extents are too closely packed and vice versa). Note that other embodiments may not use queues NEAR_PQ and FAR_PQ or equivalent structures, e.g. by evaluating all disks afresh for each extent.

In some embodiments, the members of priority queues NEAR_PQ and FAR_PQ are same as the respective priority queues BAD_DEADLN_PQ and DEADLN_PQ, although the key values are different in these two kinds of queues. In one embodiment, the sequence number at which a storage device enters (or leaves) a shadow+(cycle value)*(number of disks) is used as a key value in priority queues FAR_PQ and NEAR_PQ.

In one embodiment illustrated in FIG. 3D, devices are moved between queues as follows, by a computer when programmed with a function called "Advance". Specifically, in act 321, Advance checks if FAR_PQ is empty and if not then in act 322 Advance checks if the device with the minimum key value in FAR_PQ (also called "head" of the queue) has key value greater than the sequence number of the current extent. If the answer in act 322 is no, then Advance invokes another function "Adjust" which performs acts 323-325 as follows. In act 323 Adjust removes the head of FAR_PQ and then in act 324 Adjust updates the device's deadline and also updates the key value for the queue NEAR_PQ. Then in act 325, function Adjust inserts the device into the queues NEAR_PQ and BAD_DEADLN_PQ and then returns control to function Advance (e.g. to act 321).

If in acts 321 and 322 the result is yes, then function Advance transfers control to act 331 that is similar to act 321. Specifically, in act 331, function Advance checks if the queue NEAR_PQ is empty and if not then goes to act 332. In act 332, function Advance checks if the head of NEAR_PQ has a key value greater than or equal to the current extent's sequence number and if not invokes function Adjust (described above). Note that function Adjust is invoked here with different arguments, and for this reason, acts 333-335 are performed on different queues as follows. In act 333, Adjust removes the head of NEAR_PQ and in act 334 Adjust updates the device's deadline and also updates the key value for the FAR_PQ. Then in act 335, function Adjust inserts the device into the the queues FAR_PQ and DEADLN_PQ.

For more details on this particular embodiment on the specific use of priority queues NEAR_PQ and FAR_PQ to maintain the priority queues BAD_DEADLN_PQ and DEADLN_PQ, see the pseudo-code that is included herein as Appendix A, at the end of this description, just before the claims. This Appendix A forms an integral portion of the current description, and is incorporated by reference herein in its entirety. Note that in the attached pseudo-code, blocks of data that have been called "extents" above, are referred to as "pieces".

Figure 4:
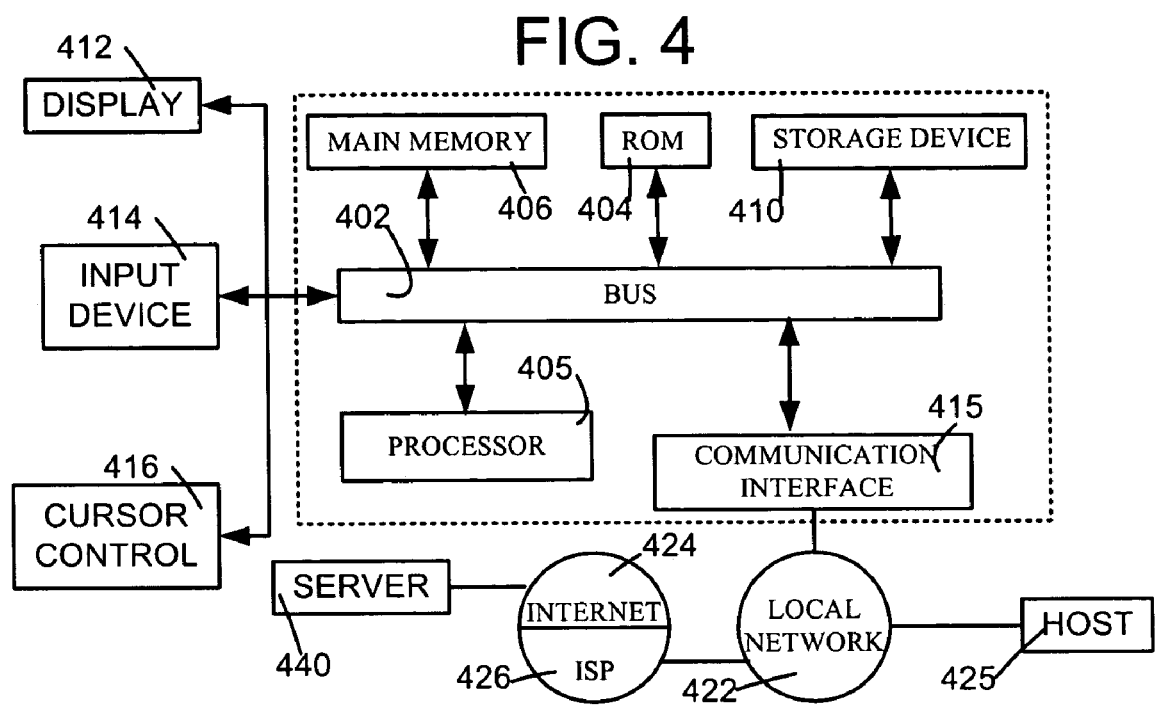
FIG. 4 illustrates, in a high level block diagram, hardware included in a computer that may be used to perform the methods of FIGS. 2B and 3B in some embodiments of the invention.

Computer 200 of FIG. 2A can be implemented by hardware that forms a computer system 400 as illustrated in FIG. 4. Specifically, computer system 400 includes a bus 402 (FIG. 4) or other communication mechanism for communicating information, and a processor 405 coupled with bus 402 for processing information. Computer system 400 also includes a main memory 406, such as a random access memory (RAM) or other dynamic storage device, coupled to bus 402 for storing information and instructions to be executed by processor 405. Main memory 406 also may be used for storing temporary variables or other intermediate information (such as the above-described priority queues) during execution of instructions to be executed by processor 405. Computer system 400 further includes a read only memory (ROM) 408 or other static storage device coupled to bus 402 for storing static information and instructions for processor 405. A storage device 410, such as a magnetic disk or optical disk, is provided and coupled to bus 402 for storing information (such as extents) and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 405. Another type of user input device is cursor control 416, such as a mouse, a trackball, or cursor direction keys for communicating direction information and command selections to processor 405 and for controlling cursor movement on display 412. This input device typically has two degrees of freedom in two axes, a first axis (e.g., x) and a second axis (e.g., y), that allows the device to specify positions in a plane.

As described elsewhere herein, distribution of data across multiple storage devices is provided by computer system 400 in response to processor 405 executing one or more sequences of one or more instructions contained in main memory 406. Such instructions may be read into main memory 406 from another computer-readable medium, such as storage device 410. Execution of the sequences of instructions contained in main memory 406 causes processor 405 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 405 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 405 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 405 retrieves and executes the instructions. The instructions received by main memory 406 may optionally be stored on storage device 410 either before or after execution by processor 405.

Computer system 400 also includes a communication interface 415 coupled to bus 402. Communication interface 415 provides a two-way data communication coupling to a network link 420 that is connected to a local network 422. Local network 422 may interconnect multiple computers (as described above). For example, communication interface 418 may be an integrated services digital network (ISDN) card or a modem to provide a data communication connection to a corresponding type of telephone line. As another example, communication interface 415 may be a local area network (LAN) card to provide a data communication connection to a compatible LAN. Wireless links may also be implemented. In any such implementation, communication interface 415 sends and receives electrical, electromagnetic or optical signals that carry digital data streams representing various types of information.

Network link 420 typically provides data communication through one or more networks to other data devices. For example, network link 420 may provide a connection through local network 422 to a host computer 425 or to data equipment operated by an Internet Service Provider (ISP) 426. ISP 426 in turn provides data communication services through the world wide packet data communication network 428 now commonly referred to as the "Internet". Local network 422 and network 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 440 might transmit a requested code for an application program through Internet 428, ISP 426, local network 422 and communication interface 415. In accordance with the invention, one such downloaded application provides for implementing fine grain data distribution across multiple storage devices within a database management systems as described herein.

The received code may be executed by processor 405 as it is received, and/or stored in storage device 410, or other non-volatile storage for later execution. In this manner, computer system 400 may obtain application code in the form of a carrier wave.

Numerous modifications and adaptations of the embodiments described herein will be apparent to the skilled artisan in view of the disclosure. For example, although in some embodiments the acts of FIGS. 2B and 3B are performed automatically by a programmed computer, in other embodiments one or more of such acts are performed by the computer under manual direction (e.g. after approval by a human). Accordingly numerous such modifications and adaptations are encompassed by the attached claims.

APPENDIX A

PSEUDO-CODE

```
1  # Input state
2  boolean REBALANCE       # TRUE if rebalance, FALSE if allocation.
3  array of disks ALL_DISKS   # All disks present, eq. [D1, D2, D3, D4]
4  array of pieces FILE_PIECES  # Present if rebalance, otherwise empty.
5
6  # Output disk selection order, eq. [D1, D2, D3, D1, D2, D4, ... ]
7  array of disks DISK_ORDER
8
9  function InitGlobals( ) is
10    piece_count = number of elements in FILE_PIECES
11    total_weight = 0.0
12    SHADOW           = 0.25              # Quarter cycle before or after
13    FILE_PIECE_LIST  = new LIST
14    DEADLN_PQ        = new PQ
15    BAD_DEADLN_PQ    = new PQ
16    NEAR_EXT_PQ      = new PQ
17    FAR_EXT_PQ       = new PQ
18    for each disk in ALL_DISKS do
19       piece_list of disk = new LIST
20       if (state of disk is not DROPPING) then
21          weight of disk = total_allocation_units of disk
22          total_weight += weight of disk
23       else
24          weight of disk = 0.0
25       end if # state of disk is not DROPPING
26    end do
27    for each disk in ALL_DISKS do
28       if (weight of disk != 0.0) then
29          # Weight proportional to reciprocal of storage size relative to
30          # the total of all storage sizes.
31          cycle of disk = total_weight / (weight of disk)
32       else
33          # Never select this disk.
34          cycle of disk = LARGEST_POSSIBLE_NUMBER
35       end if # weight of disk != 0.0
36    end do
37  end function InitGlobals
38
```

APPENDIX A-continued

PSEUDO-CODE

```
39   function Balance( ) is
40     if (REBALANCE) then
41       # Construct per-disk piece list for each pre-existing piece.
42       for each piece in FILE_PIECES do
43         if (disk_number of piece != NODISK) then
44           disk = ALL_DISKS[disk_number of piece]
45           insert piece into FILE_PIECE_LIST
46           insert piece into piece_list of disk
47         end if # disk_number of piece != NODISK
48       end do
49     end if # REBALANCE
50     # Remove all disks from all Qs, to allow Balance( ) to be called
51     # multiple times after a single GlobalInit( ) call.
52     for each disk in ALL_DISKS do
53       if (disk is member of FAR_PIECE_PQ) then
54         remove disk from FAR_PIECE_PQ
55       else if (disk is member of NEAR_PIECE_PQ)
56         remove disk from NEAR_PIECE_PQ
57       end if # disk is member of FAR_PIECE_PQ
58       if (disk is member of DEADLN_PQ) then
59         key_value = priority of disk in DEADLN_PQ
60         remove disk from DEADLN_PQ
61       else if (disk is member of BAD_DEADLN_PQ)
62         key_value = priority of disk in BAD_DEADLN_PQ
63         remove disk from BAD_DEADLN_PQ
64       else
65         key_value = 0.0
66       end if # disk is member of DEADLN_PQ
67       if (state of disk is DROPPING) continue
68       cycle_value = cycle of disk
69       # Make adjustments if performing a rebalance.
70       if (REBALANCE) then
71         # Carry over imbalance from previous call to Balance( ).
72         qot = key_value / cycle_value
73         rem = key_value – qot * cycle_value
74         if (piece_list of disk is not empty) then
75           # Use first piece position if existing pieces on disk to
76           # minimize total movement of existing pieces.
77           piece = head of piece_list of disk
78           cycle_value = number of piece
79         else
80           # Use extremely large value plus cycle if no pieces.
81           cycle_value += 100000.0
82         end if # piece_list of disk is not empty
83         cycle_value += rem
84       else
85         # Add a small amount of noise if doing allocation placement.
86         cycle_value += random_number_between(0.00, 0.01)
87       end if # REBALANCE
88       # Place all disks into DEADLINE and FAR Q's. They will be placed
89       # into the correct Q's the first time Adjust( ) is called below.
90       # Note that the term priority is the same as key_value of the Q.
91       insert disk setting priority as cycle_value into DEADLN_PQ
92       insert disk setting priority as 0.0 into FAR_PIECE_PQ
93     end do
94     # Distribute disks fractionally thru their cycles. The DEADLINE Q
95     # ends up with the same members as before, but the key values are
96     # changed to reflect the initial placement.
97     temporary_list = new LIST # List used in LIFO order.
98     while (DEADLN_PQ is not empty) do
99       disk = head of DEADLN_PQ
100      remove disk from DEADLN_PQ
101      insert disk into temporary_list
102    end do
103    piece_number = 0
104    while (temporary_list is not empty) do
105      disk = head of temporary_list
106      remove disk from temporary_list
107      insert disk setting priority as piece_number into DEADLN_PQ
108      piece_number = piece_number + 1;
109    end do
110    # Initialize queues by adjusting current position as piece number 0.
111    # The disks placed into the DEADLINE / FAR Q's above are now moved
112    # to their correct Q's.
113    for each disk in ALL_DISKS do
114      if (state of disk is not DROPPING) Adjust(disk, 0, FALSE)
115    end do
```

APPENDIX A-continued

PSEUDO-CODE

```
116    # This loop is where each piece is allocated or re-allocated.
117    piece_number = 0
118    while (piece_number < piece_count) do
119       # Relocate the piece only if necessary.
120       if (!Reloc(piece_number)) then
121          # No need to relocate the piece. This is quite normal when
122          # rebalancing, but indicates failure when allocating.
123          if (not REBALANCE) exit(FAIL)
124       end if # !Reloc(piece_number)
125       piece_number = piece_number + 1
126    end do
127  end function Balance
128
129
130  function Reloc(piece_number) is
131     if (FILE_PIECE_LIST is not empty) then
132        piece = head of FILE_PIECE_LIST
133        remove piece from FILE_PIECE_LIST
134        if (disk_number of piece != NODISK) then
135           src = ALL_DISKS[disk_number of piece]
136        end if # disk_number of piece != NODISK
137     else
138        src = NULL
139     end if # FILE_PIECE_LIST is not empty
140     # Determine ideal destination disk for piece based upon the disk
141     # most needing a piece, respecting cycle requirements when possible.
142     # If there are no suitable destinations, both queues will be empty
143     # and the result is NULL.
144     Advance(piece_number)
145     if (DEADLN_PQ is not empty) then
146        dst = head of DEADLN_PQ
147     else if (BAD_DEADLINE_PQ is not empty)
148        dst = head of BAD_DEADLN_PQ
149     else
150        dst = NULL
151     end if # DEADLN_PQ is not empty
152     # Add disk to the output. It is OK if no suitable destination was
153     # found when the primary piece pre-exists and does not have to move.
154     if (RelocExt(src, dst, piece_number)) then
155        DISK_ORDER[piece_number] = dst
156     else if (src and (state of src is not DROPPING))
157        DISK_ORDER[piece_number] = src
158     else
159        exit(FAIL)
160     end if # RelocExt(src, dst, piece_number)
161  end function Reloc
162
163
164  function RelocExt(src, dst, piece_number) is
165     moving = FALSE # Initally assume no piece movement required.
166     # Currently allocated pieces might need to be moved.
167     if (src) then
168        if (state of src is DROPPING) then
169           # The piece must be moved to a disk which does not
170           # prohibit allocations.
171           moving = TRUE
172        end if # state of src is DROPPING
173     else if (dst)
174     # Moving the piece is optional. Movement is desirable when there is
175     # a destination that satisfies the cycle shadow requirement and the
176     # disk holding the piece is more than 1½ cycles ahead of the
177     # destination disk. Even if the destination disk does not satisfy
178     # the cycle shadow requirement, move if the disk holding the
179     # piece is more than three cycles ahead of the destination.
180        if (dst is member of FAR_PIECE_PQ) then
181           climit = 1.5
182        else
183           climit = 3.0
184        end if # dst is member of FAR_PIECE_PQ
185        if (src is member of DEADLN_PQ) then
186           key_value = priority of src in DEADLN_PQ
187        else if (src is member of BAD_DEADLN_PQ)
188           key_value = priority of src in BAD_DEADLN_PQ
189        else
190           key_value = LARGEST_POSSIBLE_NUMBER
191        end if # src is member of DEADLN_PQ
192        sdelta = key_value − piece_number
```

APPENDIX A-continued

PSEUDO-CODE

```
193     if (dst is member of DEADLN_PQ) then
194         key_value = priority of dst in DEADLN_PQ
195     else if (dst is member of BAD_DEADLN_PQ)
196         key_value = priority of dst in BAD_DEADLN_PQ
197     else
198         key_value = LARGEST_POSSIBLE_NUMBER
199     end if # dst is member of DEADLN_PQ
200     ddelta = key_value - piece_number
201     if (sdelta/(cycle of src) - ddelta/(cycle of dst) > climit)
202         moving = TRUE
203     else
204         # Non-existant pieces must always be placed.
205         moving = TRUE
206     end if # src
207     if (moving) then
208         if (src) then
209             # Remove piece from src disk piece list.
210             remove piece from piece_list of src
211             Adjust(src, piece_number, FALSE)
212         end if # src
213         if (dst) then
214             insert piece into piece_list of dst
215             Adjust(dst, piece_number, TRUE)
216         end if # dst
217     else
218         # Disk keeping piece.
219         if (src)
220             Adjust(src, piece_number, TRUE)
221     end if # moving
222     return moving
223 end function RelocExt
224
225
226 function Advance (piece_number) is
227     while (FAR_PIECE_PQ is not empty) do
228         disk = head of FAR_PIECE_PQ
229         if (priority of disk in FAR_PIECE_PQ > piece_number) break
230         Adjust(disk, piece_number, FALSE)
231     end do
232     while (NEAR_PIECE_PQ is not empty) do
233         disk = head of NEAR_PIECE_PQ
234         if (priority of disk in NEAR_PIECE_PQ >= piece_number) break
235         Adjust(disk, piece_number, FALSE)
236     end do
237 end function Advance
238
239
240 function Adjust(disk, piece_number, credit) is
241     dlin = piece_number # Default if disk is not in any Qs.
242     if (disk is member of BAD_DEADLN_PQ) then
243         dlin = priority of disk in BAD_DEADLN_PQ
244         remove disk from BAD_DEADLN_PQ
245     end if # disk is member of BAD_DEADLN_PQ
246     if (disk is member of DEADLN_PQ) then
247         dlin = priority of disk in DEADLN_PQ
248         remove disk from DEADLN_PQ
249     end if # disk is member of DEADLN_PQ
250     if (disk is member of FAR_PIECE_PQ) then
251         remove disk from FAR_PIECE_PQ
252     end if # disk is member of FAR_PIECE_PQ
253     if (disk is member of NEAR_PIECE_PQ) then
254         remove disk from NEAR_PIECE_PQ
255     end if # disk is member of NEAR_PIECE_PQ
256     # Disks being dropped are prohibited from getting new allocations.
257     if (state of disk is DROPPING) return
258     # Advance deadline by one cycle.
259     if (credit) dlin += cycle of disk
260     # Compute nearness for disk and place into appropriate queues.
261     for each piece in piece_list of disk do
262         # Compute piece number where disk will be too near the next piece.
263         tpiece_number = (number of piece) - SHADOW * (cycle of disk)
264         if (dlin < tpiece_number) break
265         # Compute fisrt piece number where disk will be far from piece.
266         tpiece_number = (number of piece) + SHADOW * (cycle of disk) +
267                                                                0.75
268         # Place disks too near current piece in the near queue.
269         if (dlin <= tpiece_number) then
```

APPENDIX A-continued

PSEUDO-CODE

```
270        insert disk setting priority as tpiece_number into NEAR_PIECE_PQ
271        insert disk setting priority as dlin into BAD_DEADLN_PQ
272        break
273      end if # dlin <= tpiece_number
274      # This piece is no longer relevant.
275      remove piece from piece_list of disk
276    end do
277    # piece number for next transition is infinite if no more pieces.
278    if (piece_list of disk is empty) tpiece_number =
279                                          LARGEST_POSSIBLE_NUMBER
280    # Disks not placed in the near queue by above loop go in far queue.
281    if (disk is not member of NEAR_PIECE_PQ) then
282       insert disk setting priority as tpiece_number into FAR_PIECE_PQ
283       insert disk setting priority as dlin into DEADLN_PQ
284    end if # disk is not member of NEAR_PIECE_PQ
285 end function Adjust
```

What is claimed is:

1. A method of storing a plurality of pieces of data among a plurality of data storage devices, the method comprising:

calculating a cycle value for each data storage device, the cycle value being calculated as total data storage capacity of all data storage devices divided by data storage capacity of said each data storage device;

selecting a data storage device for storing a current piece in a sequence of pieces that will be stored one after another, the selected data storage device having the smallest key value among the plurality of data storage devices, each data storage device having a key value to be used in said selecting;

storing the current piece in the selected data storage device;

determining a new key value for the selected data storage device based on at least (a) the cycle value of the selected data storage device and (b) a sequence number of the current piece, in said sequence;

repeating said selecting for at least another piece in the sequence, based on the new key value; and storing said another piece in another data storage device selected by said repeating.

2. The method of claim 1 wherein:

a prioritized queue is used to hold identifiers of the data storage devices and respective key values.

3. The method of claim 1 wherein:

initial key values for the data storage devices are determined at random.

4. The method of claim 1 wherein:

initial key values for the data storage devices are set to a sequence of whole numbers used to identify the data storage devices.

5. The method of claim 1 wherein:

during determining of the new key value for the selected data storage device, a random fraction is added thereto.

6. The method of claim 1 wherein:

the selected data storage device is selected at random from among several data storage devices, in response to each of said several data storage devices having said smallest key value in the first subset.

7. The method of claim 1 further comprising:

changing said plurality of data storage devices to form a new plurality of data storage devices;

calculating a new cycle value, for each data storage device in said new plurality of data storage devices; and for each piece in said sequence of pieces stored in the plurality of data storage devices prior to said changing:

applying a predetermined criterion to the plurality of data storage devices to form two sets of data storage devices, wherein a first set of data storage devices will be preferred over a second set of data storage devices; and selecting a data storage device from the first set of data storage devices if the first set is not null and otherwise from the second set of data storage devices.

8. The method of claim 7 wherein:

the predetermined criterion is based on said each piece when placed in a current data storage device being outside a range centered around any other piece pre-existing in the current data storage device, said range being based on the cycle value of the current data storage device.

9. The method of claim 7 wherein:

identifiers for data storage devices in the two sets are held in two corresponding prioritized queues; and key values for data storage devices identified in the prioritized queues are based on said range.

10. The method of claim 7 wherein:

said changing comprises adding at least one data storage device to said plurality of data storage devices.

11. The method of claim 7 wherein:

said changing comprises removing at least one data storage device from said plurality of data storage devices.

12. A computer-readable storage medium encoded with instructions to:

calculate a cycle value for each data storage device, the cycle value being calculated as total data storage capacity of all data storage devices divided by data storage capacity of said each data storage device;

select a data storage device for storing a current piece in a sequence of pieces that will be stored one after another, the selected data storage device having the smallest key value among the plurality of data storage devices, each data storage device having a key value to be used in said selecting;

store the current piece in the selected data storage device;

determine a new key value for the selected data storage device based on at least (a) the cycle value of the selected data storage device and (b) a sequence number of the current piece, in said sequence;

repeatedly execute said instructions to select for at least another piece in the sequence, based on the new key value; and store said another piece in another data storage device selected by said repeated execution.

13. A computer comprising a processor and a memory coupled to the processor, the memory being encoded with instructions to:

automatically calculate a cycle value of each storage device, the cycle value being total data storage capacity of all storage devices divided by data storage capacity of said storage device;

automatically select a data storage device for storing a current piece in a sequence of pieces when stored one after another, the selected data storage device having the smallest key value among the plurality of data storage devices, each data storage device having a key value to be used in said selecting; and automatically determine a new key value for the selected data storage device based on at least (a) the cycle value of the selected data storage device and (b) a sequence number of the current piece, in said sequence.

14. An apparatus for packaging a plurality of files, the apparatus comprising:

means for calculating a cycle value of each storage device, the cycle value being total data storage capacity of all storage devices divided by data storage capacity of said storage device;

means for applying a predetermined criterion to the plurality of data storage devices to form a first subset of data storage devices;

means for selecting a data storage device for storing a current piece in a sequence of pieces when stored one after another, the selected data storage device having the smallest key value among the plurality of data storage devices, each data storage device having a key value to be used in said selecting; and means for determining a new key value for the selected data storage device based on at least (a) the cycle value of the selected data storage device and (b) a sequence number of the current piece, in said sequence.

15. The computer-readable storage medium of claim 12 comprising a memory, wherein said memory is encoded with said instructions.

16. The method of claim 1 further comprising:

applying a predetermined criterion to the plurality of data storage devices to divide the plurality into two sets of data storage devices, wherein a first set will be preferred over a second set;

wherein said selecting selects the selected data storage device from the first set if not null and otherwise from the second set; and wherein the predetermined criterion is based on each piece when placed in a current data storage device being outside a range centered around any other piece pre-existing in the current data storage device, said range being based on the cycle value of the current data storage device.

17. The computer of claim 13 wherein:

a prioritized queue is used to hold identifiers of the data storage devices and respective key values.

18. The computer of claim 13 wherein:

initial key values for the data storage devices are determined at random.

19. The computer of claim 13 wherein:

initial key values for the data storage devices are set to a sequence of whole numbers used to identify the data storage devices.

20. The computer of claim 13 wherein:

during determining of the new key value for the selected data storage device, a random fraction is added thereto.

21. The computer of claim 13 wherein:

the selected data storage device is selected at random from among several data storage devices, in response to each of said several data storage devices having said smallest key value in the first subset.

22. The computer of claim 13 wherein the memory is further encoded with instructions to:

change said plurality of data storage devices to form a new plurality of data storage devices;

calculate a new cycle value, for each data storage device in said new plurality of data storage devices; and for each piece in said sequence of pieces stored in the plurality of data storage devices prior to said changing:

apply a predetermined criterion to the plurality of data storage devices to form two sets of data storage devices, wherein a first set of data storage devices will be preferred over a second set of data storage devices; and select a data storage device from the first set of data storage devices if the first set is not null and otherwise from the second set of data storage devices.

23. The computer of claim 13 wherein:

the predetermined criterion is based on said each piece when placed in a current data storage device being outside a range centered around any other piece pre-existing in the current data storage device, said range being based on the cycle value of the current data storage device.

24. The computer of claim 13 wherein:

identifiers for data storage devices in the two sets are held in two corresponding prioritized queues; and key values for data storage devices identified in the prioritized queues are based on said range.

25. The computer of claim 13 wherein:

said instructions to change comprise instructions to add at least one data storage device to said plurality of data storage devices.

26. The computer of claim 22 wherein:

said instructions to change comprise instructions to remove at least one data storage device from said plurality of data storage devices.

27. The apparatus of claim 14 wherein:

a prioritized queue is used to hold identifiers of the data storage devices and respective key values.

28. The apparatus of claim 14 wherein:

initial key values for the data storage devices are determined at random.

29. The apparatus of claim 14 wherein:

initial key values for the data storage devices are set to a sequence of whole numbers used to identify the data storage devices.

30. The apparatus of claim 14 wherein:

during determining of the new key value for the selected data storage device, a random fraction is added thereto.

31. The apparatus of claim 14 wherein:

the selected data storage device is selected at random from among several data storage devices, in response to each of said several data storage devices having said smallest key value in the first subset.

32. The apparatus of claim 14 further comprising:

means for changing said plurality of data storage devices to form a new plurality of data storage devices;

means for calculating a new cycle value, for each data storage device in said new plurality of data storage devices; and means for applying a predetermined criterion to the plurality of data storage devices to form two sets of data storage devices, wherein a first set of data storage devices is preferred over a second set of data storage devices; and means for selecting a data storage device from the first set of data storage devices if the first set is not null and otherwise from the second set of data storage devices.

33. The apparatus of claim 14 wherein:

the predetermined criterion is based on said each piece when placed in a current data storage device being outside a range centered around any other piece pre-existing in the current data storage device, said range being based on the cycle value of the current data storage device.

34. The apparatus of claim 14 wherein:

identifiers for data storage devices in the two sets are held in two corresponding prioritized queues; and key values for data storage devices identified in the prioritized queues are based on said range.

35. The apparatus of claim 14 wherein:

said means for changing comprises means for adding at least one data storage device to said plurality of data storage devices.

36. The apparatus of claim 32 wherein:

said means for changing comprises means for removing at least one data storage device from said plurality of data storage devices.

* * * * *

UNITED STATES PATENT AND TRADEMARK OFFICE
CERTIFICATE OF CORRECTION

PATENT NO.       : 7,395,369 B2
APPLICATION NO.  : 10/848845
DATED            : July 1, 2008
INVENTOR(S)      : Sepez et al.

Page 1 of 1

It is certified that error appears in the above-identified patent and that said Letters Patent is hereby corrected as shown below:

In column 2, line 18, delete "follows." and insert -- follows: --, therefor.

In column 7, line 18, delete "+" and insert -- ± --, therefor.

In column 7, line 48, after "into the" delete "the".

In column 9–10, in "Appendix A", line 4, delete "eq." and insert -- eg. --, therefor.

In column 9–10, in "Appendix A", line 6, delete "eq." and insert -- eg. --, therefor.

In column 15–16, in "Appendix A", line 74, delete "fisrt" and insert -- first --, therefor.

Signed and Sealed this

Seventeenth Day of November, 2009

David J. Kappos
*Director of the United States Patent and Trademark Office*